(12) United States Patent
You et al.

(10) Patent No.: US 11,431,063 B2
(45) Date of Patent: Aug. 30, 2022

(54) BATTERY MODULE HAVING STRUCTURE FACILITATING SERIES-PARALLEL CONNECTIONS AND BATTERY PACK COMPRISING SAME

(71) Applicant: LG Chem, Ltd., Seoul (KR)

(72) Inventors: Jung-Been You, Daejeon (KR); Dal-Mo Kang, Daejeon (KR); Jeong-O Mun, Daejeon (KR); Jae-Uk Ryu, Daejeon (KR); Ho-June Chi, Daejeon (KR)

(73) Assignee: LG Energy Solution, Ltd.

( * ) Notice: Subject to any disclaimer, the term of this patent is extended or adjusted under 35 U.S.C. 154(b) by 62 days.

(21) Appl. No.: 16/753,145

(22) PCT Filed: Feb. 21, 2019

(86) PCT No.: PCT/KR2019/002152
§ 371 (c)(1),
(2) Date: Apr. 2, 2020

(87) PCT Pub. No.: WO2019/203433
PCT Pub. Date: Oct. 24, 2019

(65) Prior Publication Data
US 2020/0295337 A1   Sep. 17, 2020

(30) Foreign Application Priority Data

Apr. 20, 2018 (KR) .......................... 10-2018-0046305

(51) Int. Cl.
*H01M 50/20* (2021.01)
*H01M 50/502* (2021.01)
*H01M 50/531* (2021.01)

(52) U.S. Cl.
CPC ......... *H01M 50/502* (2021.01); *H01M 50/20* (2021.01); *H01M 50/531* (2021.01); *H01M 2220/20* (2013.01)

(58) Field of Classification Search
CPC .... H01M 50/20; H01M 50/24; H01M 50/502; H01M 2220/20; H01M 50/116;
(Continued)

(56) References Cited

U.S. PATENT DOCUMENTS

| 7,829,216 | B2 | 11/2010 | Han et al. | |
| 8,980,465 | B2* | 3/2015 | Ahn | H01M 50/172 429/178 |
| 9,236,617 | B2* | 1/2016 | Ogami | H01M 6/46 |
| 2005/0208375 | A1 | 9/2005 | Sakurai | |

(Continued)

FOREIGN PATENT DOCUMENTS

| CN | 102593411 A | 7/2012 |
| CN | 104011901 A | 8/2014 |

(Continued)

OTHER PUBLICATIONS

Extended European Search Report including Written Opinion for Application No. 19788636.9 dated Apr. 6, 2021, 8 pages.

(Continued)

*Primary Examiner* — Michael L Dignan
(74) *Attorney, Agent, or Firm* — Lerner, David, Littenberg, Krumholz & Mentlik, LLP

(57) ABSTRACT

A battery module includes: a unit module stack formed by stacking a plurality of unit modules, each of which has a battery cell, a bus bar attached to an electrode lead provided to the battery cell, and a bus bar frame attached to a terrace portion of the battery cell to accommodate at least a portion of the electrode lead and the bus bar, wherein each bus bar frame includes a connector holder; and a connector fixed by (Continued)

the connector holders of at least two unit modules of the plurality of unit modules to contact the bus bar.

10 Claims, 14 Drawing Sheets

(58) Field of Classification Search
CPC ...... H01M 50/531; Y02E 60/10; B29C 65/52; B29L 2031/3468
See application file for complete search history.

(56) References Cited

U.S. PATENT DOCUMENTS

| | | | |
|---|---|---|---|
| 2007/0207377 A1* | 9/2007 | Han | H01M 50/543 |
| | | | 429/162 |
| 2008/0124617 A1* | 5/2008 | Bjork | H01M 50/502 |
| | | | 429/90 |
| 2012/0171557 A1 | 7/2012 | Ahn | |
| 2013/0045401 A1* | 2/2013 | Yoon | H01M 50/543 |
| | | | 429/90 |
| 2013/0101883 A1 | 4/2013 | Zhao | |
| 2015/0064540 A1 | 3/2015 | Roh et al. | |
| 2015/0140373 A1 | 5/2015 | Han et al. | |
| 2015/0303415 A1 | 10/2015 | Kayano et al. | |
| 2016/0126523 A1 | 5/2016 | Arena et al. | |
| 2016/0233465 A1 | 8/2016 | Lee et al. | |
| 2016/0276647 A1* | 9/2016 | Lee | H01M 50/202 |
| 2019/0001838 A1 | 1/2019 | Choi et al. | |
| 2019/0363320 A1* | 11/2019 | Yang | H01M 10/482 |
| 2020/0328397 A1* | 10/2020 | Park | H01M 50/54 |

FOREIGN PATENT DOCUMENTS

| | | |
|---|---|---|
| CN | 104769746 A | 7/2015 |
| EP | 2919294 A1 | 9/2015 |
| EP | 3690987 A1 | 8/2020 |
| JP | 2005268004 A | 9/2005 |
| JP | 2005285452 A | 10/2005 |
| JP | 3802457 B2 | 7/2006 |
| JP | 2007073510 A | 3/2007 |
| JP | 3169685 U | 8/2011 |
| JP | 2017538243 A | 12/2017 |
| JP | 2018006017 A | 1/2018 |
| KR | 100932227 B1 | 12/2009 |
| KR | 20130137299 A | 12/2013 |
| KR | 101367693 B1 | 2/2014 |
| KR | 20150055255 A | 5/2015 |
| KR | 20150060830 A | 6/2015 |
| KR | 20160016502 A | 2/2016 |
| KR | 101735875 B1 | 5/2017 |
| KR | 20170052989 A | 5/2017 |
| KR | 20180038253 A | 4/2018 |
| WO | 2014073443 A1 | 5/2014 |

OTHER PUBLICATIONS

Search report from International Application No. PCT/KR2019/002152, dated Jun. 7, 2019.

Search Report dated Dec. 23, 2021 from the Office Action for Chinese Application No. 201980005187.5 issued Jan. 6, 2022, 3 pages.

* cited by examiner

FIG. 1 – PRIOR ART
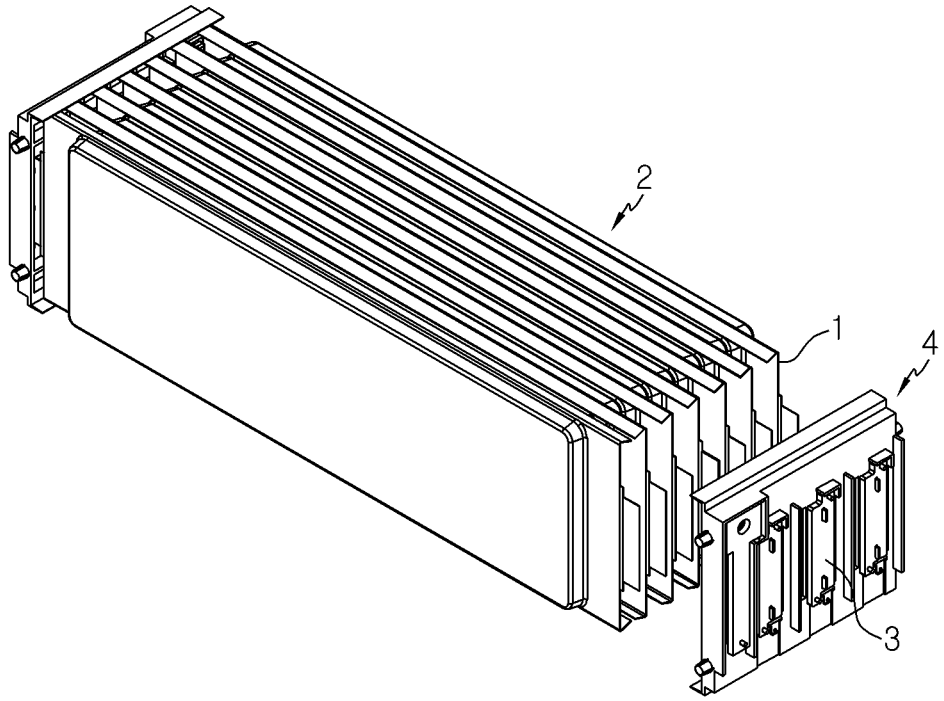
FIG. 2 – PRIOR ART
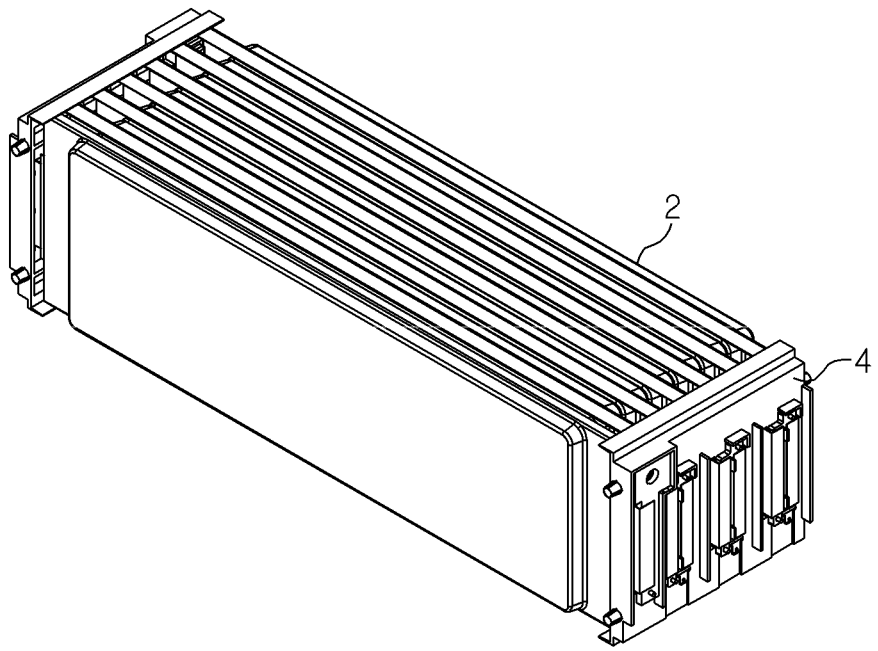

BATTERY MODULE HAVING STRUCTURE FACILITATING SERIES-PARALLEL CONNECTIONS AND BATTERY PACK COMPRISING SAME

CROSS-REFERENCE TO RELATED APPLICATIONS

The present application is a national phase entry under 35 U.S.C. § 371 of International Application No. PCT/KR2019/002152, filed Feb. 21, 2019, published in Korean, which claims priority to Korean Patent Application No. 10-2018-0046305 filed on Apr. 20, 2018 in the Republic of Korea, the disclosures of which are incorporated herein by reference.

TECHNICAL FIELD

The present disclosure relates to a battery module having a structure facilitating serial/parallel connection and a battery pack including the battery module, and more particularly, to a battery module capable of freely making a desired serial/parallel connection by providing a bus bar to each unit module and electrically connecting two or more neighboring battery cells by using a connector of various sizes, and a battery pack including the battery module.

BACKGROUND ART

In a battery module including a plurality of battery cells, the battery cells are electrically connected by connecting electrode leads of the battery cells to each other using a bus bar.

A conventional battery module is shown in FIGS. 1 and 2.

In the conventional battery module, the plurality of battery cells 1 may be stacked to form a cell stack 2, and a bus bar frame 4 including a bus bar 3 may be coupled to both sides of the battery cell stack 2 to form a serial connection, a parallel connection or a combination of serial and parallel connection among the plurality of battery cells 1.

The conventional battery module separately requires a dedicated bus bar frame 4 suitable for a desired electrical connection type and the size and shape of the cell stack 2. Thus, whenever a new model is developed, it is needed to develop and manufacture a new bus bar frame suitable for the new model.

DISCLOSURE

Technical Problem

The present disclosure is designed to solve the problems of the related art, and therefore the present disclosure is directed to easily manufacturing a battery module of various shapes just by changing the number of battery cells and the size or number of connectors according to a desired electric connection type without preparing a dedicated bus bar frame whenever developing a new battery module model.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a unit module stack formed by stacking a plurality of unit modules, each of which includes a battery cell, a bus bar attached to an electrode lead provided to the battery cell, and a bus bar frame attached to a terrace portion of the battery cell to accommodate at least a portion of the electrode lead and the bus bar, wherein each bus bar frame includes a connector holder; and a connector fixed by the connector holders of at least two unit modules of the plurality of unit modules to contact the bus bar.

A fixed location of the connector may be made into a block by the connector holder.

The bus bar frame may include: a first unit frame configured to cover at least a portion of an upper surface of the terrace portion; and a second unit frame configured to cover at least a portion of a lower surface of the terrace portion and coupled to the first unit frame.

The first unit frame and the second unit frame may be shaped to be point-symmetric to each other.

The first unit frame and the second unit frame may respectively have a protrusion and a protrusion accommodation groove having a size and shape corresponding to the fixing protrusion, the fixing protrusion and the protrusion accommodation groove being formed at facing surfaces of the first unit frame and the second unit frame, respectively.

The fixing protrusion formed at a coupling surface of the first unit frame may be formed to have a size and shape corresponding to the protrusion accommodation groove formed at a coupling surface of the second unit frame at a location corresponding thereto.

The first unit frame and the second unit frame respectively may have a protrusion accommodation groove and a fixing protrusion formed on respective surfaces of the first unit frame and the second unit frame opposite to the facing surfaces.

In another aspect of the present disclosure, there is also provided a battery pack, comprising a plurality of the battery modules of the present disclosure.

In another aspect of the present disclosure, there is also provided a vehicle, comprising the battery pack according to an embodiment of the present disclosure.

Advantageous Effects

According to an embodiment of the present disclosure, it is possible to easily manufacture a battery module of various shapes just by changing the number of battery cells and the size or number of connectors according to a desired electric connection type without preparing a dedicated bus bar frame whenever developing a new battery module model.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 1 and 2 are diagrams showing a conventional battery module.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a battery module according to an embodiment of the present disclosure will be described with reference to FIGS. 3 to 6.

Figure 3:
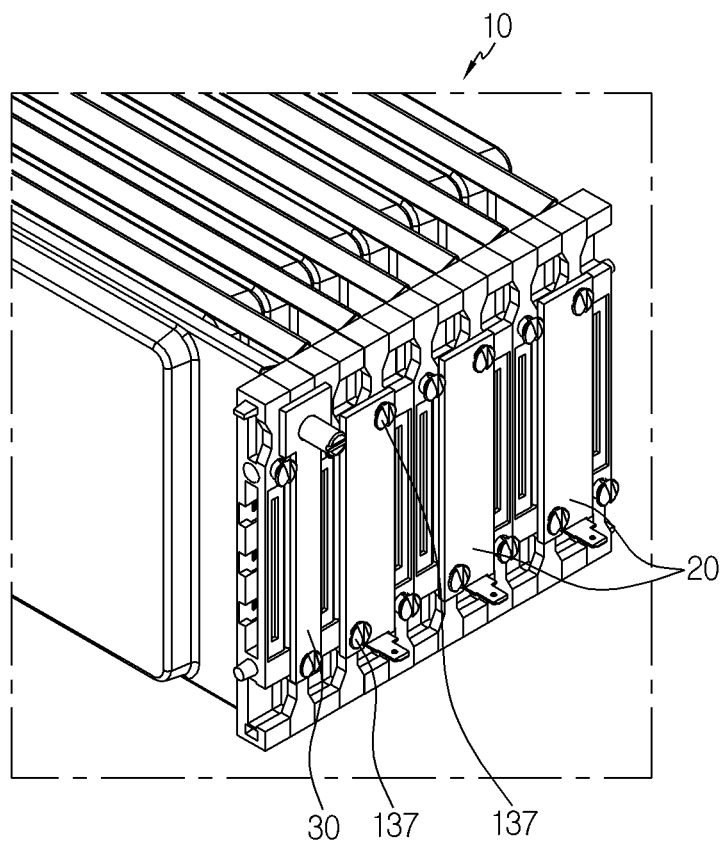
FIG. 3 is a perspective view showing a portion of a battery module according to an embodiment of the present disclosure.
Figure 4:
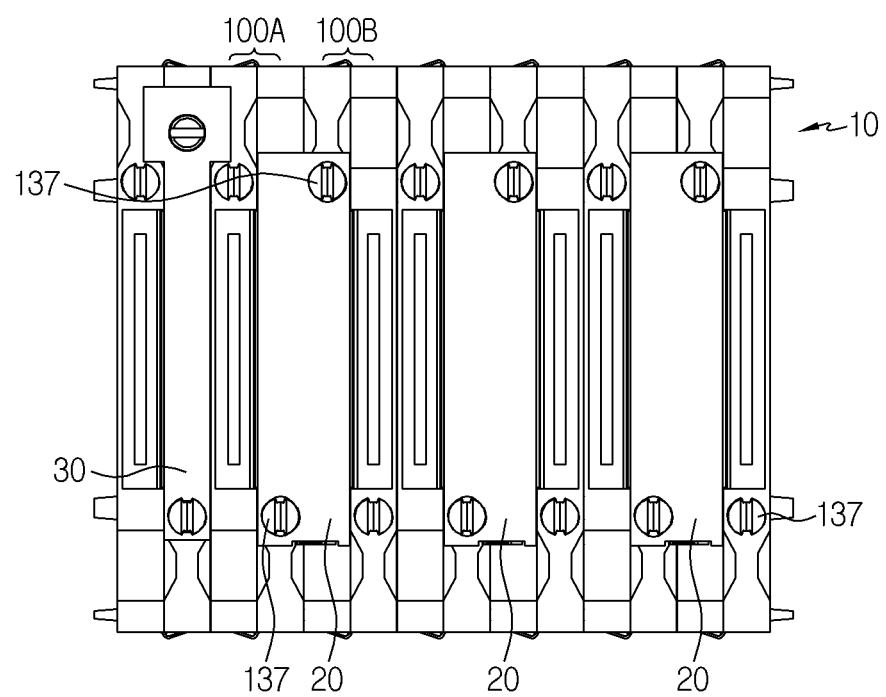
FIG. 4 is a front view showing a portion of the battery module according to an embodiment of the present disclosure.

FIG. 3 is a perspective view showing a portion of a battery module according to an embodiment of the present disclosure, and FIG. 4 is a front view showing a portion of the battery module according to an embodiment of the present disclosure. Also, FIG. 5 is a diagram showing a unit module stack applied to the battery module according to an embodiment of the present disclosure, and FIG. 6 is an exploded perspective view showing a unit module applied to the battery module according to an embodiment of the present disclosure.

Referring to FIGS. 3 and 4, a battery module according to an embodiment of the present disclosure includes a unit module stack 10, a connector 20, and an external terminal 30.

Figure 5:
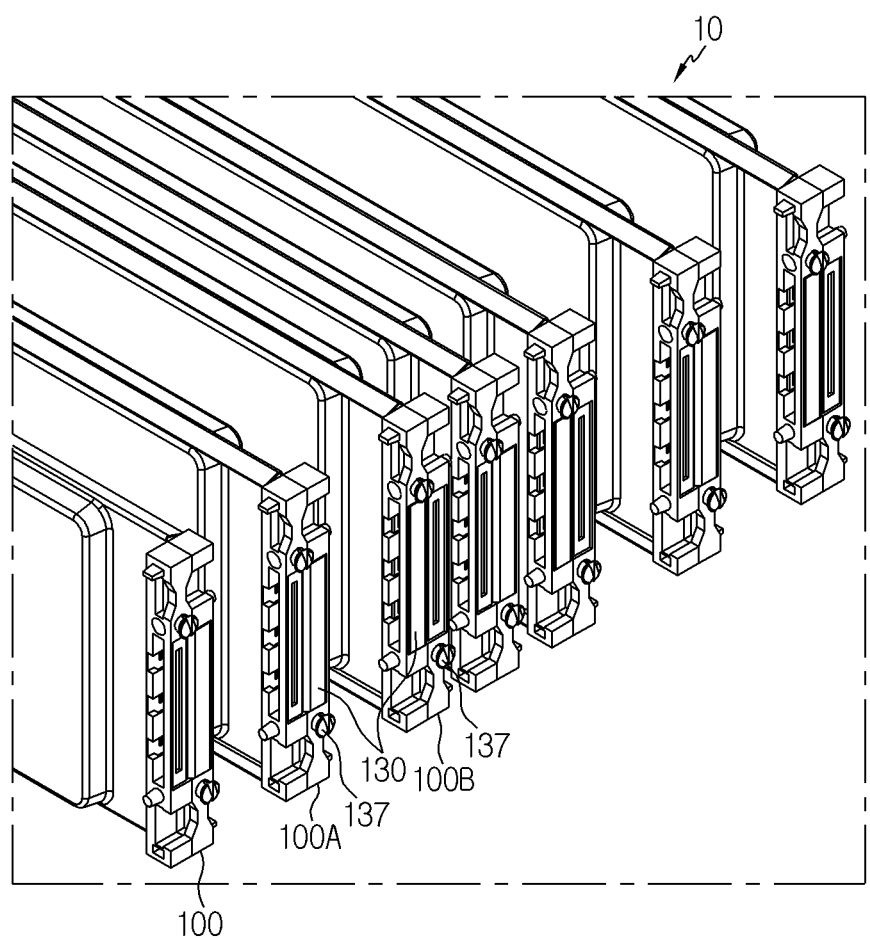
FIG. 5 is a diagram showing a unit module stack applied to the battery module according to an embodiment of the present disclosure.
Figure 6:
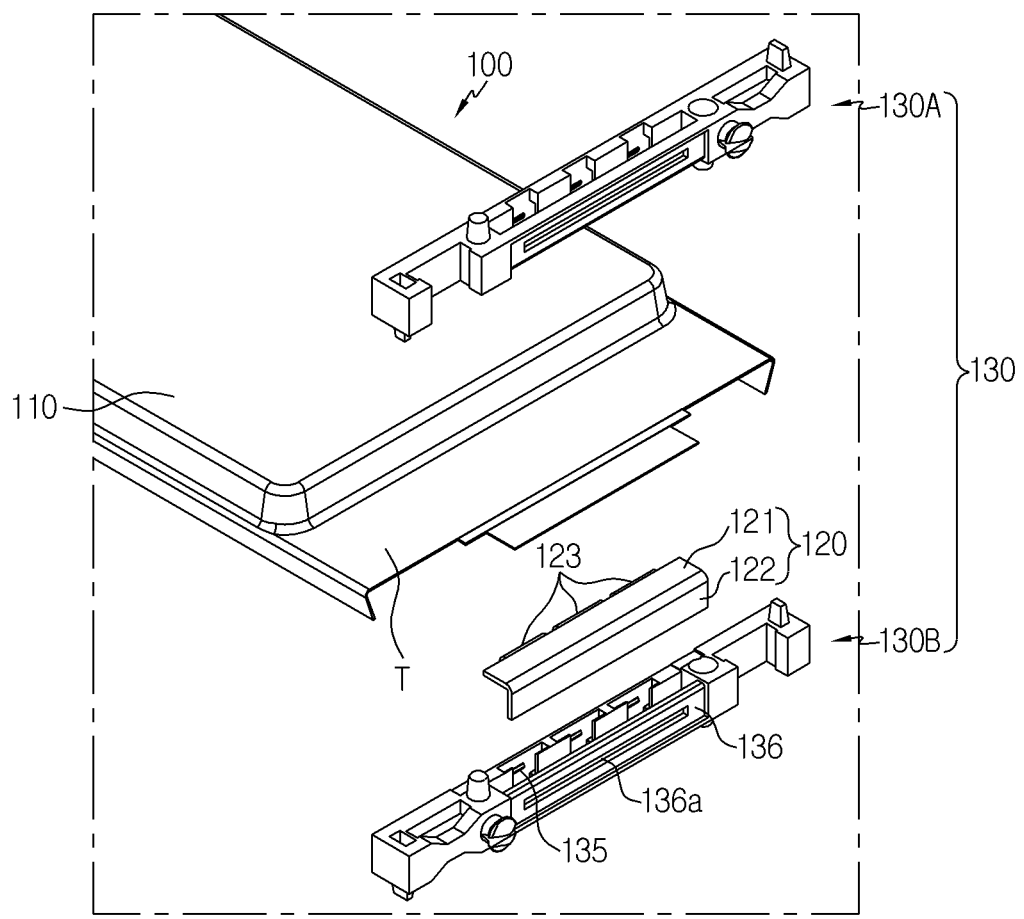
FIG. 6 is an exploded perspective view showing a unit module applied to the battery module according to an embodiment of the present disclosure.

Referring to FIGS. 5 and 6, the unit module stack 10 is a stack implemented by stacking a plurality of unit modules 100. Each unit module 100 includes a battery cell 110, a bus bar 120 connected to an electrode lead 114 of the battery cell 110, and a bus bar frame 130 attached to a terrace portion T of the battery cell 110. The unit module stacks 10 are stacked such that broad surfaces of neighboring battery cells 110 face each other, thereby forming one unit module stack 10.

The connector 20 is a component adapted to electrically connect neighboring unit module stacks 10 or neighboring unit modules 100, and the connector 20 connects bus bars 120 provided in the neighboring unit module stacks 10 or neighboring unit modules 100 to each other.

The external terminal 30 contacts the bus bar 120 provided to the unit module 100 disposed at the outermost side among the plurality of unit modules 100 of the unit module stack 10 and functions as a terminal for electrical connection with an external electronic device.

Next, the battery cell 110 of the unit module 100 according to an embodiment of the present disclosure will be described in detail with reference to FIGS. 6 and 7.

Figure 7:
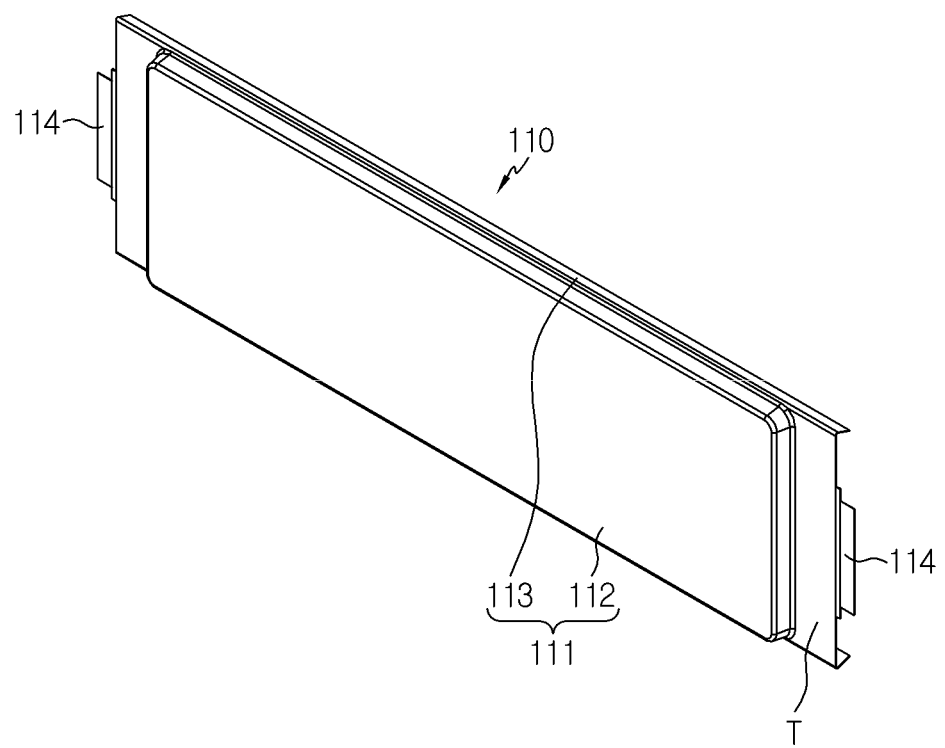
FIG. 7 is a perspective view showing a battery cell applied to the battery module according to an embodiment of the present disclosure.

FIG. 6 is an exploded perspective view showing a unit module applied to the battery module according to an embodiment of the present disclosure, and FIG. 7 is a perspective view showing a battery cell applied to the battery module according to an embodiment of the present disclosure.

Referring to FIGS. 6 and 7, a pouch-type battery cell may be used as the battery cell 110. The battery cell 110 may include an electrode assembly (not shown), a cell case 111, and an electrode lead 114.

Although not shown in the figures, the electrode assembly is configured so that separators are interposed between positive electrode plates and negative electrode plates alternately stacked repeatedly, and separators are preferably disposed at both outermost sides thereof for insulation.

The positive electrode plate includes a positive electrode current collector and a positive electrode active material layer coated on one or both surfaces of the positive electrode current collector. A positive electrode uncoated region where the positive electrode active material is not coated is formed at one end of the positive electrode plate. The positive electrode uncoated region functions as a positive electrode tab connected to the electrode lead 114.

Similarly, the negative electrode plate includes a negative electrode current collector and a negative electrode active material layer coated on one or both surfaces of the negative electrode current collector. A negative electrode uncoated region where the negative electrode active material is not coated is formed at one side of the negative electrode plate. The negative electrode uncoated region functions as a negative electrode tab connected to the electrode lead 114.

In addition, the separator is interposed between the positive electrode plate and the negative electrode plate to prevent the electrode plates having different polarities from contacting each other directly. The separator may be made of a porous material to allow ions to move between the positive electrode plate and the negative electrode plate by using an electrolyte as a medium.

The cell case 111 includes an accommodation portion 112 for accommodating the electrode assembly (not shown) and a sealing portion 113 extending in a circumferential direction of the accommodation portion so that the electrode lead 114 is thermally fused thereto in an outwardly drawn state to seal the cell case 111.

The electrode lead 114 is classified into a positive electrode lead connected to the positive electrode tab and a negative electrode lead connected to the negative electrode tab, and the positive electrode lead and the negative electrode lead are drawn out of the cell case 111 in opposite directions.

Meanwhile, in the present disclosure, in the sealing portion 113 formed around the accommodation portion 112, a region positioned in the direction to which the electrode lead 114 is drawn out is particularly defined as a terrace portion T.

Next, the bus bar 120 of the unit module 100 according to an embodiment of the present disclosure will be described in detail with reference to FIG. 6 again.

Referring to FIG. 6, the bus bar 120 is bonded to the electrode lead 114 by welding in a state of being fixed to the bus bar frame 130, so that a portion of the bus bar 120 is located inside the bus bar frame 130 and the remaining portion is exposed out of the bus bar frame 130. The portion of the bus bar 120 exposed out of the bus bar frame 130 is connected to the connector 20 (see FIGS. 3 and 4) explained above, thereby electrically connecting neighboring battery unit modules 100.

More specifically, the bus bar 120 includes a bonding portion 121, an exposed portion 122, and a hook portion 123.

The bonding portion 121 extends in a direction parallel to the electrode lead 114, namely in the horizontal direction, to contact the electrode lead 114 and is located inside the bus bar frame 130. The exposed portion 122 is bent from the bonding portion 121 and extends in a direction perpendicular to the bonding portion 121, and also the exposed portion 122 is drawn out of the bus bar frame 130 and placed on a bus bar placing portion 136, explained later.

The hook portion 123 extends from an end of the bonding portion 121 in a direction parallel to the exposed portion 122, and one or more hook portions 123 are provided. The hook portion 123 allows the bus bar 120 to be fixed to the inside of the bus bar frame 130 and is coupled or fixed to a hook fixing portion 135 provided at an inner surface of the bus bar frame 130.

As described above, the bus bar 120 is fixed and mounted inside the bus bar frame 130 so that a portion of the bus bar 120 is exposed out of the bus bar frame 130. Also, the bonding portion 121 located inside the bus bar frame 130 is bonded to the lower surface of the electrode lead 114, and the exposed portion 122 located at the outer side of the bus bar frame 130 is connected to the connector 20 to electrically connect neighboring unit modules 100 to each other.

Next, the bus bar frame 130 of the unit module 100 according to an embodiment of the present disclosure will be described in detail with reference to FIGS. 8 to 11 along with FIG. 6.

Figure 8:
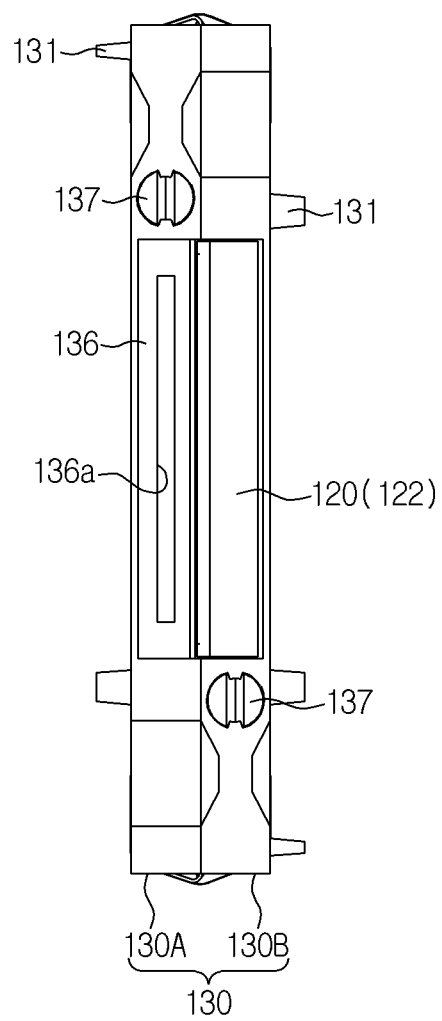
FIG. 8 is a front view showing that the unit module applied to the battery module according to an embodiment of the present disclosure is coupled to a bus bar.
Figure 9:
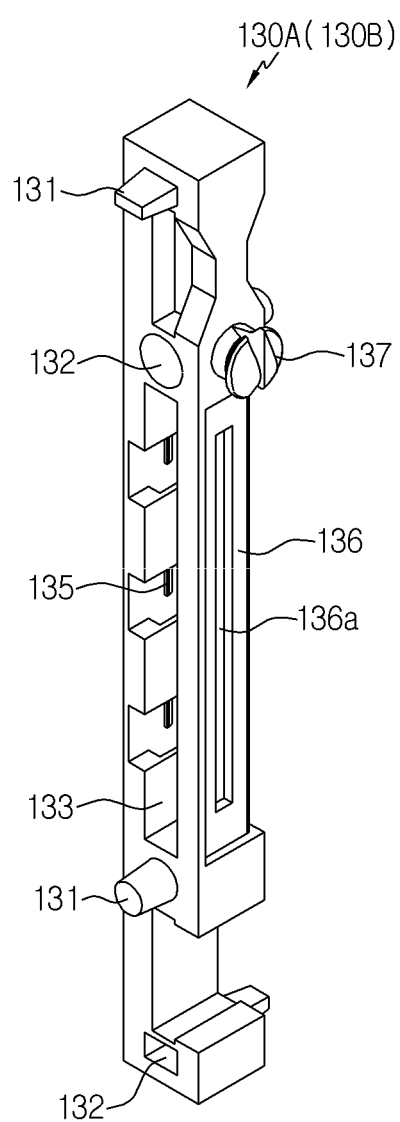
FIGS. 9 and 10 are perspective views showing a unit frame of a bus bar frame applied to the battery module according to an embodiment of the present disclosure at different angles.
Figure 10:
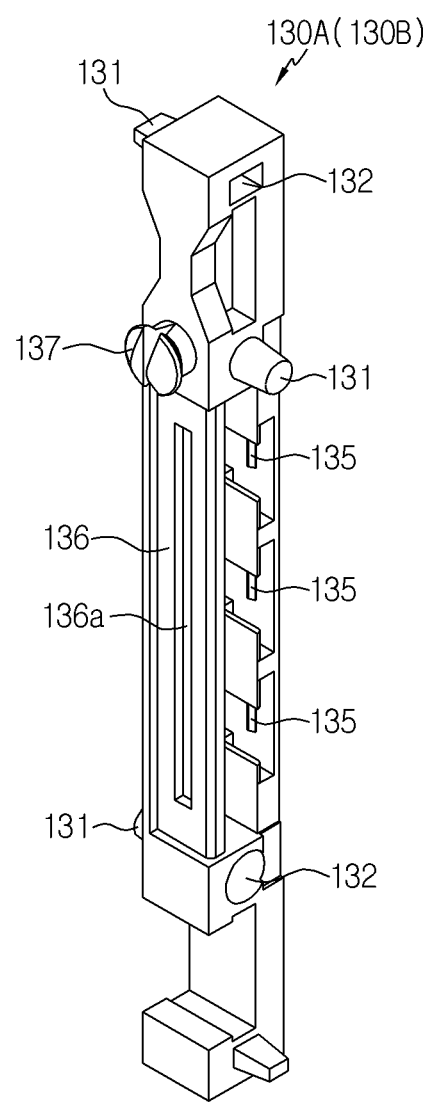
Figure 11:
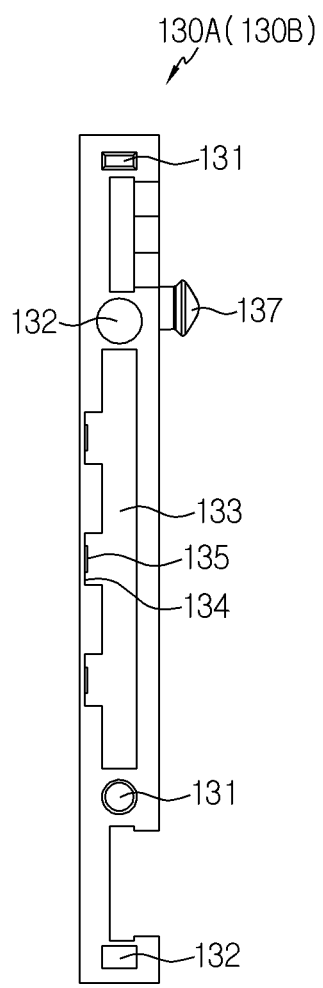
FIG. 11 is a side view showing the unit frame of the bus bar frame applied to the battery module according to an embodiment of the present disclosure.

FIG. 8 is a front view showing that the unit module applied to the battery module according to an embodiment of the present disclosure is coupled to a bus bar, FIGS. 9 and 10 are perspective views showing a unit frame of a bus bar frame applied to the battery module according to an embodiment of the present disclosure at different angles, and FIG. 11 is a side view showing the unit frame of the bus bar frame applied to the battery module according to an embodiment of the present disclosure.

First, referring to FIGS. 6 and 8, the bus bar frame 130 is attached to the terrace portion T of the battery cell 110 and functions as a support for the bus bar 120 as described above.

The bus bar frame 130 is implemented by combining a first unit frame 130A and a second unit frame 130B having the same shape. That is, the first unit frame 130A and the second unit frame 130B are components having the same shape, where the first unit frame 130A covers at least a portion of the upper surface of the terrace portion T and the second unit frame 130B covers at least a portion of the lower portion of the terrace portion T. The first unit frame 130A and the second unit frame 130B are coupled to each other.

Meanwhile, when the first unit frame 130A and the second unit frame 130B are coupled to each other to form one bus bar frame 130, the first unit frame 130A and the second unit frame 130B are point-symmetric to each other.

That is, in the completed one bus bar frame 130, if the first unit frame 130A is rotated by 180 degrees with respect to the center point in the longitudinal direction, the first unit frame 130A has the same shape as the second unit frame 130B.

When the pair of unit frames 130A, 130B point-symmetric to each other are coupled to each other as above, the bus bar 120 is drawn through a gap of the coupling surfaces thereof. That is, the exposed portion 122 of the bus bar 120 is drawn through the gap between the coupling surfaces of the first unit frame 130A and the second unit frame 130B.

The drawn bus bar 120 is bent toward the first unit frame 130A or the second unit frame 130B and is placed on the bus bar placing portion 136 formed at the first unit frame 130A or the second unit frame 130B. Here, the bending direction of the bus bar 120 is determined according to whether the bus bar 120 is electrically connected to the unit module 100 in contact with the first unit frame 130A or the unit module in contact with the second unit frame 130B.

As described above, since the pair of unit frames 130A, 130B are components having the same shape, the detailed structure of the bus bar frame 130 will be described based on one unit frame (130A or 130B) with reference to FIGS. 9 to 11.

Referring to FIGS. 9 to 11, the unit frames 130A, 130B may include a fixing protrusion 131, a protrusion accommodation groove 132, a welding slit 133, a hook accommodation groove 134, a hook fixing portion 135, a bus bar placing portion 136, and a connector holder 137.

At least one fixing protrusion 131 and at least one protrusion accommodation groove 132 are formed at the coupling surfaces of the unit frames 130A, 130B and surfaces opposite thereto, and the fixing protrusion 131 and the protrusion accommodation groove 132 are formed in pairs at corresponding locations at the facing surfaces of the unit frames 130A, 130B. That is, the fixing protrusion 131 formed at the coupling surface of the first unit frame 130A has a size and shape corresponding to the protrusion accommodation groove 132 formed at the coupling surface of the second unit frame 130B at a position corresponding thereto, and similarly the protrusion accommodation groove 132 formed at the coupling portion of the first unit frame 130A has a size and shape corresponding to the fixing protrusion 131 formed at the coupling surface of the second unit frame 130B at a location corresponding thereto.

As the fixing protrusion 131 and the protrusion accommodation groove 132 are formed in pair, the first unit frame 130A and the second unit frame 130B may be coupled and fixed to each other.

In addition, since the fixing protrusion 131 and the protrusion accommodation groove 132 are formed not only at the facing surfaces of the unit frames 130A, 130B but also at surfaces opposite thereto, neighboring unit modules 100A, 100B (see FIGS. 4 ad 5) may also be coupled using the fixing protrusion 131 and the protrusion accommodation groove 132.

Referring to FIGS. 9 and 11, the welding slit 133 is formed at a surface perpendicular to the bonding surface of the unit frames 130A, 130B and allows welding to be performed on the bonding portion of the electrode lead 114 (see FIG. 5) and the bus bar 120 located inside the bus bar frame 130. The welding slit 133 may be formed to have a length corresponding to the width of the bonding portion of the electrode lead 114 and the bus bar 120 so that welding is performed over the entire width on the bonding portion of the electrode lead 114 and the bus bar 120.

The bus bar frame 130 is a component attached to the battery cell 110 to configure the unit module 100. The bus bar frame 130 may also function as a pressing jig for pressing the bus bar 120 fixed and coupled therein to be closely adhered to the electrode lead 114. Also, since the welding slit 133 is provided, welding may be performed easily without any additional work for securing a space for welding.

The hook accommodation groove 134 extends from the welding slit 133 and gives a space in which the hook portion 123 of the bus bar 120 may be accommodated. In view of this function, the hook accommodation groove 134 may be formed in the same number as the hook portion 123.

The hook fixing portion 135 is formed on an inner wall of the hook accommodation groove 134 and has a shape corresponding to the hook portion 123 so as to be fastened with the hook portion 123. That is, the hook fixing portion 135 may be formed in various shapes such as a groove or a protrusion formed on the hook accommodation groove 134.

The bus bar placing portion 136 is formed concavely on the side surface of the bus bar frame 130 to have a size and shape corresponding to the exposed portion 122 so that the exposed portion 122 of the bus bar 120 exposed out of the bus bar frame 130 may be placed thereon without shaking.

The bus bar placing portion 136 may have a damage-preventing groove 136a formed at the surface thereof as a concave groove along in the length direction thereof. The damage-preventing groove 136a prevents the bus bar placing portion 136 from being damaged during the welding process for coupling the bus bar 120 and the connector 20 (see FIGS. 3 and 4).

That is, the bus bar frame 130 may be made of an injection-molded resin. In this case, during the welding process for coupling the exposed portion 122 of the bus bar 120 placed on the placing portion 136 to the connector 20, the bus bar placing portion 136 is highly likely to be damaged by heat.

Thus, the groove is formed at a position corresponding to the welding line where the welding is performed, so that the bus bar 120 and the bus bar placing portion 136 do not contact each other partially, thereby preventing the injection-molded resin from melting due to heat conduction caused by welding.

Next, the connector holder 137 will be described in detail with reference to FIGS. 8 to 11 along with FIGS. 3 and 4.

The connector holder 137 is formed to protrude on the same plane as the bus bar placing portion 136 of the unit frames 130A, 130B, and at least one connector holder 137 is formed at one longitudinal side and/or the other longitudinal side of the unit frames 130A, 130B.

The connector holder 137 is a component applied to fix the connector 20 when welding is performed to bond the connector 20 and the bus bar 120. That is, the fixed location of the connector 20 is made into a block by the connector holder 137, and the connector holder 137 is inserted through an insert hole formed in the connector 20 with a size and shape corresponding to the connector holder 137 to fix the connector 20. Thus, it is possible to perform welding for bonding the connector 20 and the bus bar 120 without applying a separate fixing jig.

Referring to FIGS. 3 and 4, the connector holders 137 respectively provided to a pair of neighboring unit modules 100A, 100B or three or more neighboring unit modules 100 are simultaneously fastened together with one connector 20. By doing so, the bus bar 120 of the first unit module 100A and the bus bar 120 of the second unit module 100B, which are bent toward each other, are in common contact with one connector 20 to electrically connect the pair of unit modules 100A, 100B or three or more unit modules 100.

Next, various electrical connection types of the battery module according to the present disclosure will be described with reference to FIGS. 12 to 15.

Figure 12:
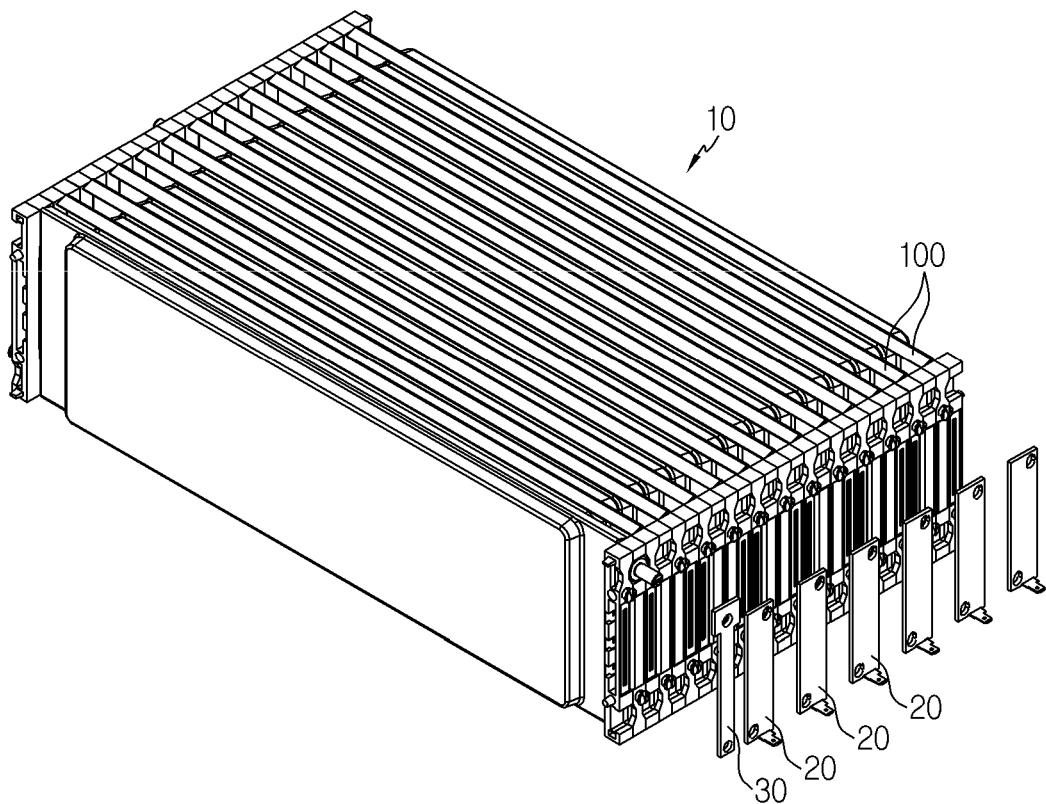
FIGS. 12 and 13 are diagrams showing that thirteen battery cells are connected to a connector coupling site made into a block by using several bus bar of the same kind in 1P/13S type.
Figure 13:
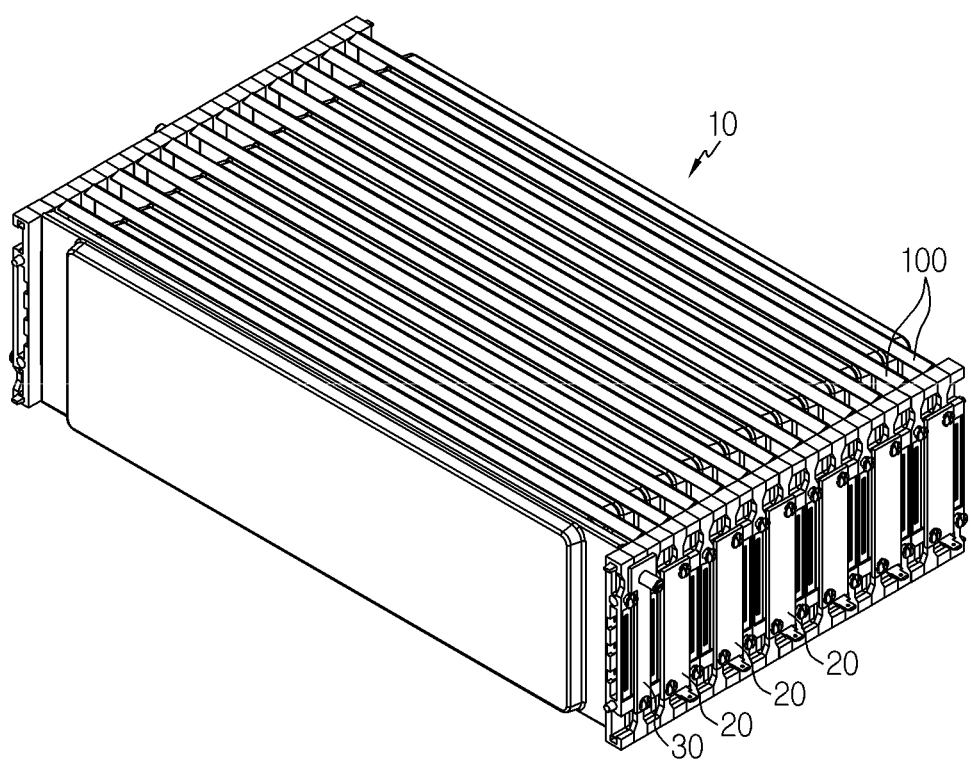
Figure 14:
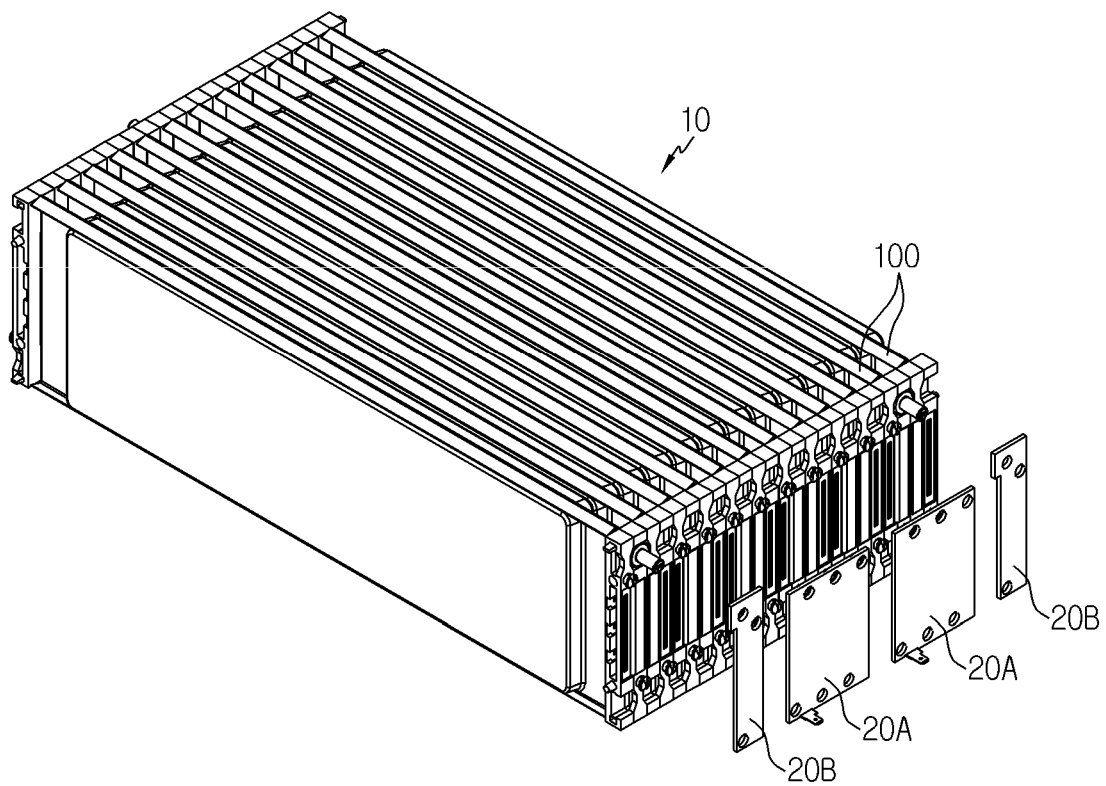
FIGS. 14 and 15 are diagrams showing that twelve battery cells are connected to the connector coupling site made into a block by using two kinds of bus bars in 2P/6S type.
Figure 15:
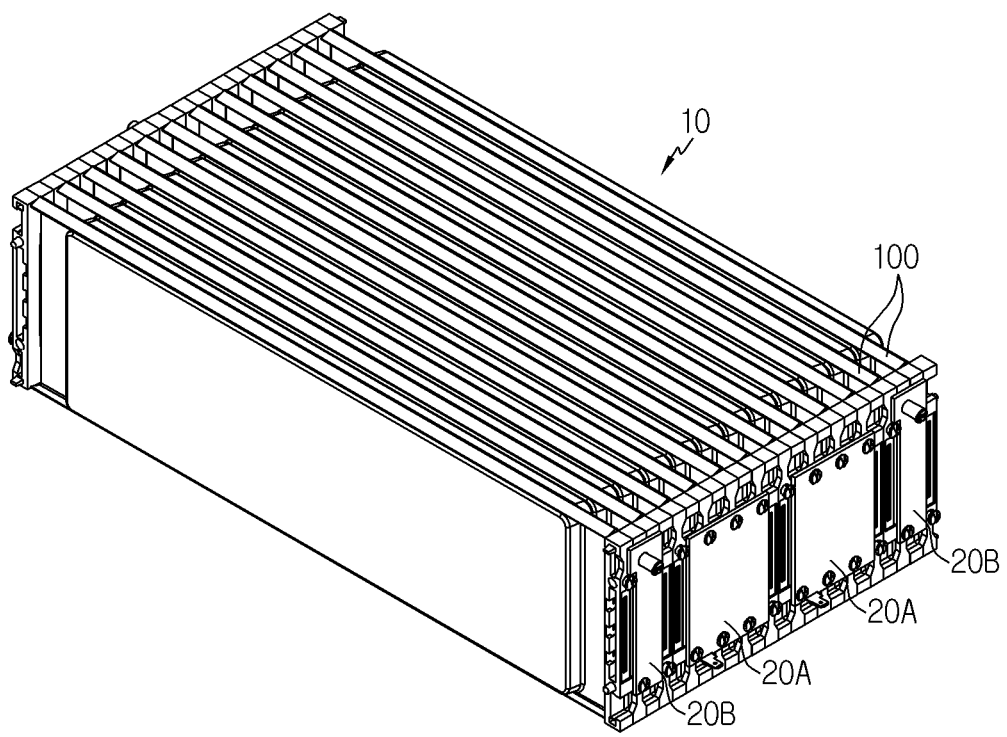

FIGS. 12 and 13 are diagrams showing that thirteen battery cells are connected to a connector coupling site made into a block by using several bus bars of the same kind in 1P/13S type, and FIGS. 14 and 15 are diagrams showing that twelve battery cells are connected to the connector coupling site made into a block by using two kinds of bus bars in 2P/6S type.

First, referring to FIGS. 12 and 13, the unit modules 100 of the unit module stack 10 are connected in series with each other. If all the unit modules 100 are connected to each other in series as above, the plurality of connectors 20 used to connect the pair of neighboring unit modules 100 may have the same size and/or shape.

Referring to FIGS. 14 and 15, some unit modules 100 are connected in parallel to form a parallel connection group, and neighboring parallel connection groups are connected in series. If electrical connection is made to combine serial connection and parallel connection as above, a first connector 20A used for the parallel connection and a second connector 20B used for the serial connection may have different sizes and/or shapes.

Namely, in the battery module according to an embodiment of the present disclosure, since unit module 100 of the unit module stack 10 has a connector holder for fixing the connector 20, the side where the connector 20 is fixed is made into a block. Accordingly, a desired electrical connection may be implemented just by applying the size and shape of the connector 20 differently, and a desired capacitance and voltage may be obtained by changing the number of connected unit modules 100.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a unit module stack formed by stacking a plurality of unit modules, each of which includes a battery cell, a bus bar attached to an electrode lead provided to the battery cell, and a bus bar frame attached to a terrace portion of the battery cell to accommodate at least a portion of the electrode lead and the bus bar, wherein each bus bar frame includes a connector holder, wherein in each of the plurality of unit modules, the battery cell has an electrode assembly, a cell case for accommodating the electrode assembly, and the electrode lead of the respective battery cell is connected to the electrode assembly and drawn out of the cell case, wherein the bus bar frame only covers one side of the cell case wherein the electrode lead is drawn out of the cell case; and
a connector fixed by the connector holders of at least two unit modules of the plurality of unit modules to contact the bus bar,
wherein the bus bar frame includes:
a first unit frame configured to cover at least a portion of an upper surface of the terrace portion; and a second unit frame configured to cover at least a portion of a lower surface of the terrace portion and coupled to the first unit frame, and wherein the first unit frame and the second unit frame are shaped to be point-symmetric to each other, and wherein adjacent battery cells among the respective battery cells of the plurality of unit modules are disposed next to each other without an intervening frame.

2. The battery module according to claim 1, wherein a fixed location of the connector is made into a block by the connector holder.

3. The battery module according to claim 1 wherein the first unit frame and the second unit frame respectively have a fixing protrusion and a protrusion accommodation groove having a size and shape corresponding to the fixing protrusion, the fixing protrusion and the protrusion accommodation groove being formed at facing surfaces of the first unit frame and the second unit frame, respectively, and wherein the bus bar is fixed to the bus bar frame with a first portion of the bus bar located inside the bus bar frame and a second portion of the bus bar drawn through a gap between coupling surfaces of the first and second unit frames so that the second portion is exposed out of the bus bar frame and connected to the connector.

4. The battery module according to claim 3, wherein the fixing protrusion formed at a coupling surface of the first unit frame is formed to have a size and shape corresponding to the protrusion accommodation groove formed at a coupling surface of the second unit frame at a location corresponding thereto.

5. The battery module according to claim 3, wherein the first unit frame and the second unit frame respectively have a protrusion accommodation groove and a fixing protrusion formed on respective surfaces of the first unit frame and the second unit frame opposite to the facing surfaces.

6. The battery module according to claim 3, wherein a fixed location of the connector is made into a block by the connector holder.

7. A battery pack, comprising a plurality of the battery modules of claim 3.

8. A vehicle, comprising the battery pack according to claim 7.

9. A battery pack, comprising a plurality of the battery modules of claim 1.

10. A vehicle, comprising the battery pack according to claim 9.

* * * * *